United States Patent
Kegel et al.

(10) Patent No.: US 8,661,177 B2
(45) Date of Patent: Feb. 25, 2014

(54) METHOD AND APPARATUS FOR CONTROLLING SYSTEM INTERRUPTS

(75) Inventors: Andrew G. Kegel, Redmond, WA (US); Mark D. Hummel, Franklin, MA (US)

(73) Assignee: Advanced Micro Devices, Inc., Austin, TX (US)

(*) Notice: Subject to any disclaimer, the term of this patent is extended or adjusted under 35 U.S.C. 154(b) by 129 days.

(21) Appl. No.: 13/330,066

(22) Filed: Dec. 19, 2011

(65) Prior Publication Data

US 2013/0159576 A1   Jun. 20, 2013

(51) Int. Cl.
*G06F 9/48* (2006.01)
*G06F 13/00* (2006.01)

(52) U.S. Cl.
USPC .......................................... 710/262; 710/268

(58) Field of Classification Search
USPC ................................................. 710/262, 268
See application file for complete search history.

(56) References Cited

U.S. PATENT DOCUMENTS

| | | | | |
|---|---|---|---|---|
| 4,695,945 | A * | 9/1987 | Irwin | 710/36 |
| 6,081,867 | A * | 6/2000 | Cox | 710/264 |
| 6,760,799 | B1 * | 7/2004 | Dunlap et al. | 710/260 |
| 7,099,977 | B2 * | 8/2006 | Chong et al. | 710/262 |
| 7,398,343 | B1 * | 7/2008 | Marmash et al. | 710/269 |
| 7,526,592 | B2 * | 4/2009 | Tsuruta | 710/268 |
| 2007/0239917 | A1 * | 10/2007 | Orita et al. | 710/268 |
| 2011/0320797 | A1 * | 12/2011 | Wilson et al. | 713/2 |

OTHER PUBLICATIONS

Andy Kegel, IOMMUv2 SMI Filter *AMD RADL* Dec. 22, 2010.

* cited by examiner

*Primary Examiner* — Glenn A Auve
(74) *Attorney, Agent, or Firm* — Williams Morgan, P.C.

(57) ABSTRACT

A method and apparatus are provided for controlling system management interrupts is disclosed. An interrupt filter comprises a memory, a comparator and a logic circuit. The memory is adapted to contain a list indicating one or more devices with permission associated with an interrupt signal. The comparator is adapted to receive an interrupt signal containing type information from the one or more devices. The comparator is adapted to compare the interrupt type against the list to determine if the one or more devices is permitted to send the interrupt signal. The logic circuit blocks or passes the interrupt signal in response to the result of the comparison.

25 Claims, 5 Drawing Sheets

METHOD AND APPARATUS FOR CONTROLLING SYSTEM INTERRUPTS

CROSS-REFERENCE TO RELATED APPLICATIONS

Not applicable.

BACKGROUND

The disclosed subject matter relates generally to system management interrupts and, more particularly, to controllably blocking selected system interrupts such as the System Management Interrupt in the AMD64 architecture.

Typical computer systems are generally comprised of a processor, memory and external devices. Ordinarily, the processor is busy executing instructions retrieved from memory that are associated with an operating system and one or more application programs, such as a word processor, a graphics program, a game, or the like. However, execution of these application programs may be temporarily suspended to handle more urgent matters. For example, in some computer systems, the external devices are configured to generate interrupt signals that are associated with a high priority concern, such as a hardware error a low-voltage or power-loss situation, a high system temperature, or the like. These types of interrupts are generally known as system management interrupts (SMI). Owing to the urgency of this type of message, the processor promptly discontinues execution of the application program and begins to execute an interrupt handling routine that identifies a course of action to be taken by the processor in response to the particular type of interrupt.

Those skilled in the art will appreciate that if one or more of the external devices generates a significant number of SMIs, the operation of the processor may be substantially engaged in executing the numerous interrupt handling routines, rather than the executing the application programs. Such a condition may appear to the user as a slow and unresponsive application program.

In some instances one or more peripheral devices may fail or otherwise begin to operate in an undesirable fashion in which numerous SMIs are generated. In other instances, an attack, commonly known as an SMI storm, may occur in which the security of one or more peripheral devices may be compromised and put into a mode of operation in which a rapid sequence of SMI interrupts are generated to intentionally slow or substantially freeze the operation of the processor with respect to the application programs.

Some computer systems allow a guest operating system (OS) in a virtualized system to have direct access to the peripheral devices. U.S. Pat. No. 7,849,287 describes one embodiment of a hardware system that would support such a direct access system. Thus, the initial attack may take the form of loading a rogue guest OS. In such a situation, software in the guest OS can mal-program the peripheral to generate an SMI storm and thereby mount a denial-of-service (DoS) attack against other guest operating systems. Attacks such as the SMI storm are highly undesirable, as they prevent the computer system from performing its main task of executing the application program.

BRIEF SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a method for controlling delivery of interrupt signals. The method comprises determining a type and source associated with an interrupt signal; determining if the type of interrupt is permitted to be sent by the source; and blocking the interrupt signal in response to the type of interrupt not being permitted by the source.

Another aspect of the disclosed subject matter is seen in an interrupt filter that comprises a memory, a comparator and a logic circuit. The memory is adapted to contain a list indicating one or more devices with permission associated with an interrupt signal. The comparator is adapted to receive an interrupt signal containing type information from the one or more devices. The comparator is adapted to compare the interrupt type against the list to determine if the one or more devices is permitted to send the interrupt signal. The logic circuit blocks or passes the interrupt signal in response to the result of the comparison.

BRIEF DESCRIPTION OF THE SEVERAL VIEWS OF THE DRAWINGS

The disclosed subject matter will hereafter be described with reference to the accompanying drawings, wherein like reference numerals denote like elements, and.

Figure 1:
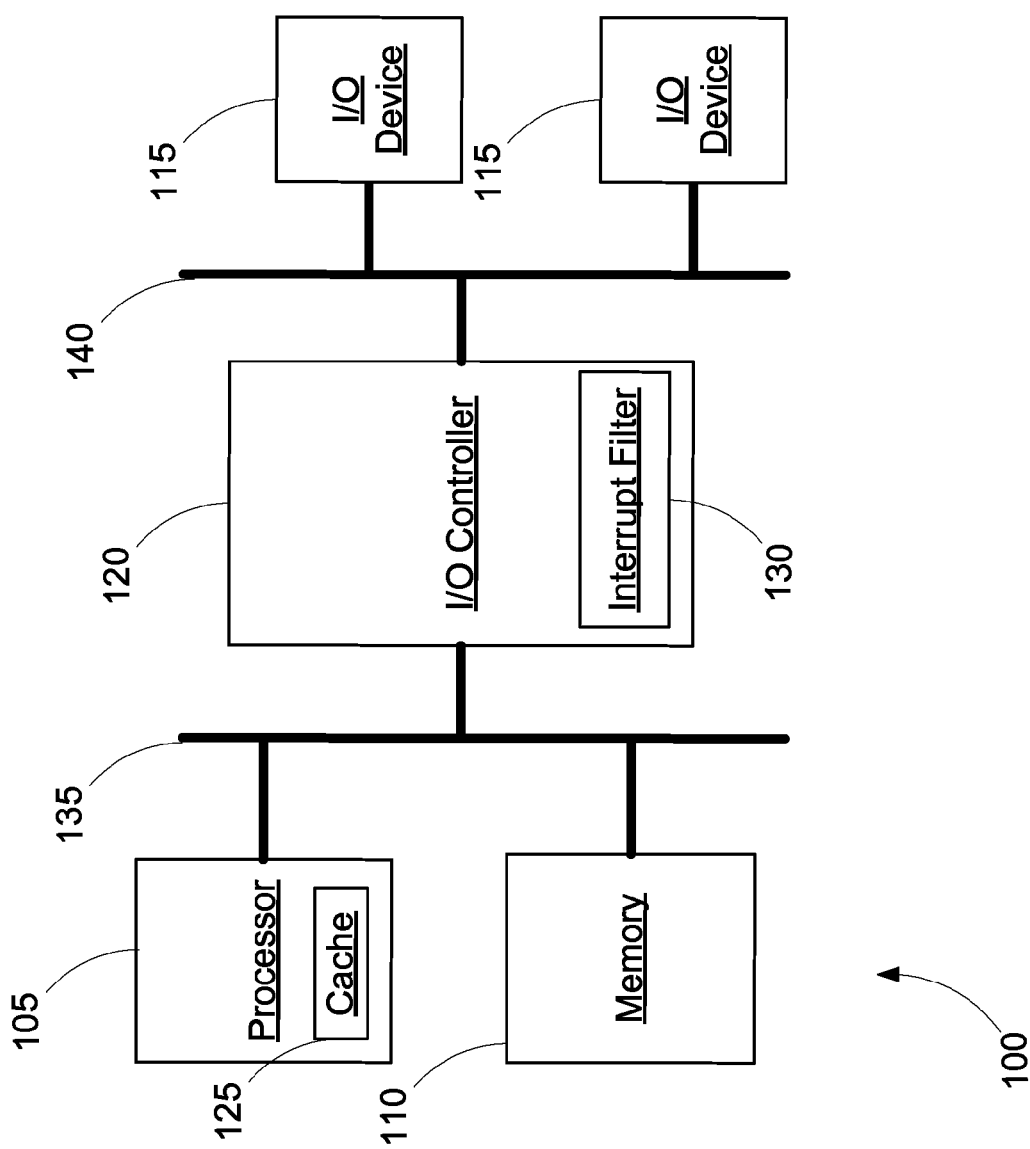
FIG. 1 is a block level diagram of a computer system, including a processor interfaced with a plurality of external devices through an I/O controller.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the disclosed subject matter shall be described in the context of a computer system 100 that generally includes one or more processors 105 coupled with an external memory 110 and a plurality of I/O devices 115 through an I/O controller 120. Those skilled in the art will recognize that a computer system 100 may be constructed from these and other components. However, to avoid obfuscating the embodiments described herein, only those components useful to an understanding of the present embodiment are included.

Generally, the computer system 100 is capable of executing instructions associated with an operating system (not shown), an application program (not shown), and an interrupt handling routine (not shown). Ordinarily, the processor 105 executes instructions that it retrieves from the memory 110 and one or more caches 125 while performing operations associated with the application programs and the operating system. Occasionally, the processor 125 will receive interrupt signals that are of a higher priority than the application programs. These high-priority interrupt signals cause the processor 105 to suspend execution of at least the application programs in favor of the interrupt handling routine.

The I/O devices 115, which may comprise, video cards, sound cards, TV tuners, USB interfaces, and the like, may be configured to generate interrupt signals, such as system management interrupts (SMIs). In one embodiment, the I/O controller 120 includes an interrupt filter 130 that receives these SMIs from the I/O devices 115 and is configured to examine each SMI and either pass the SMI to the processor 105, or block the SMI from being delivered to the SMI based on certain criteria that indicates whether the SMI may be legitimate, or not.

Figure 2:
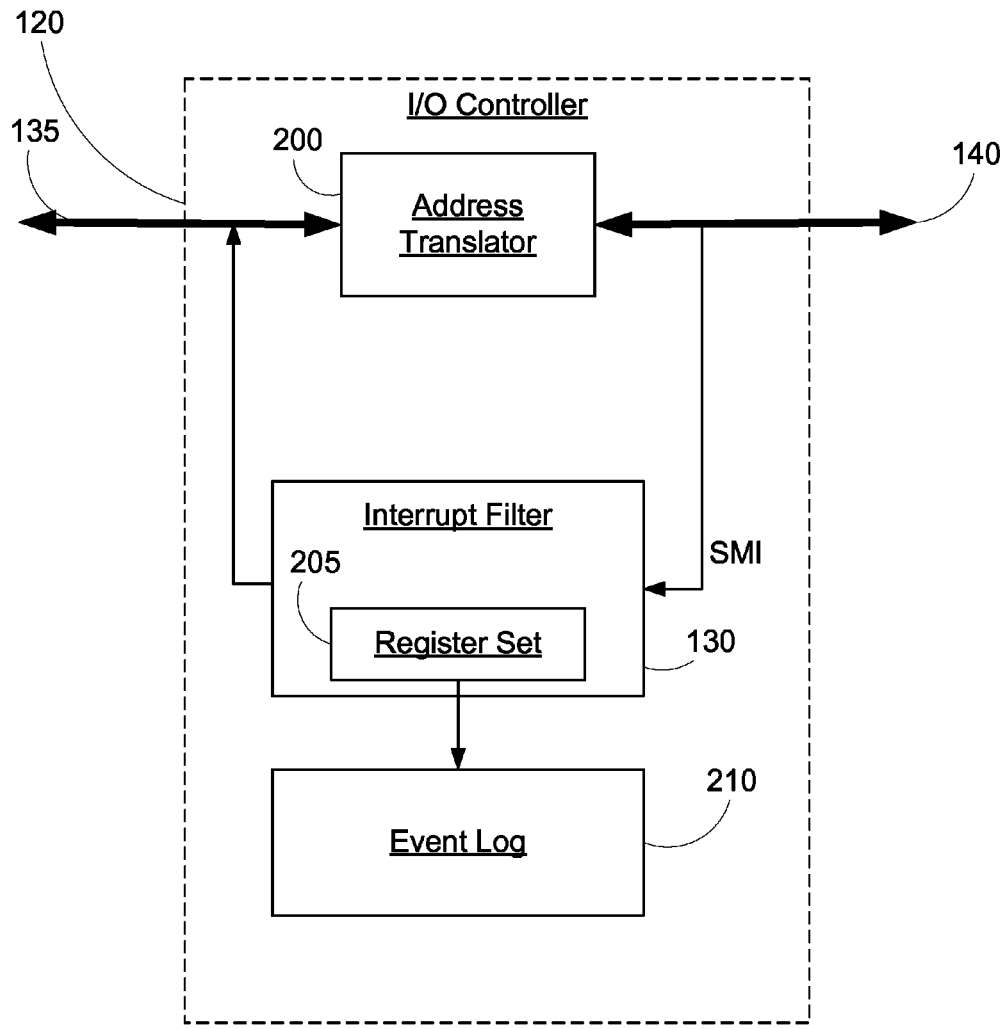
FIG. 2 is a block diagram of an interrupt filter in the I/O controller of FIG. 1.

Turning now to FIG. 2, a block diagram representing one exemplary embodiment of the I/O controller 120 is shown. Generally, the I/O controller 120 is responsible for passing data, address signals, and control signals between the I/O devices 115 and various components of the computer system 100, such as the processor 105 and the memory 110 using a bus 135 and a bus 140, respectively. In one embodiment, the bus 140 may take the form of a PCIexpress bus. Further, in some applications, the I/O controller 120 may include an address translator 200 that is responsible for performing address translations, such as memory address translations for memory operations initiated by the I/O devices 115, such as direct memory accesses (DMAs). Some of the signals received from the I/O devices 115 over the bus 140 are SMIs, which are delivered to the interrupt filter 130 where they may be either passed to the processor 105 or blocked.

In one embodiment, the interrupt filter 130 includes one or more register sets 205. Generally, the register set 205 may be used to determine whether a received SMI should be passed to the processor 105, or blocked. For example, in one embodiment, the register set 205 may contain an updatable list of one or more I/O devices that are, or are not, permitted to pass an SMI to the processor 205. This list may be populated in the register set 205 by a routine executed by the interrupt handler based on certain dynamic information, such as historical information. For example, if the interrupt handler receives too many SMIs from a particular I/O device 115 over a certain period of time, the interrupt handler may identify the I/O device as "unreliable" and store a source identifier in the register set 205, indicating that SMIs received from the unreliable source should be blocked and not passed to the processor 105. If additional unreliable I/O devices 115 are subsequently identified, the interrupt handler may add their source identifier to the register set 205 so that SMIs received from these additional unreliable I/O devices 115 may also be blocked.

In another embodiment, the register set 205 may be populated at boot time based on information available to the BIOS firmware or boot software, or the register set 205 may be populated by the hardware designer when the system 100 is designed. In some designs, the programming of the register set 205 may be fixed; in other designs, the programming of the register set 205 may be changed by OS software during runtime in order to allow a newly inserted I/O device 115 to signal system management interrupts.

Figure 3A:
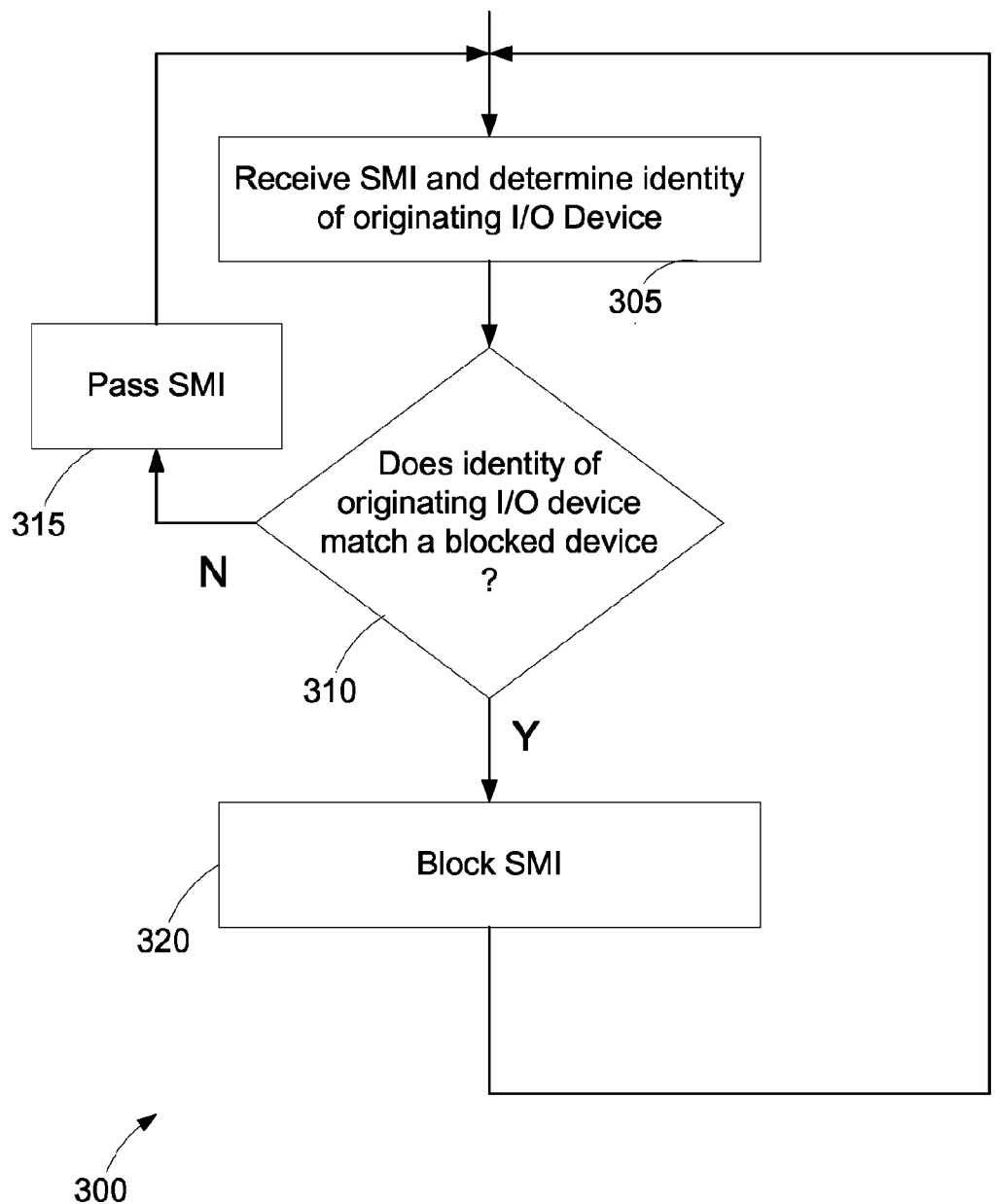
FIGS. 3A and 3B are flowcharts illustrating the operation of the alternative embodiments of the interrupt filter of FIG. 2.

FIG. 3A illustrates one embodiment of a flowchart that describes a method 300 for controlling the operation of the interrupt filter 130. The process begins at block 305, with the interrupt filter 130 receiving an SMI from a particular I/O device 115. The SMI includes information regarding the identity of the source of the SMI. The identification of the source of the SMI is obtained from the SMI itself, and in decision block 310, it is compared against one or more I/O device identifiers that are stored in the register set 205 to determine if a match exists, which indicates that the SMI should be blocked. If no match occurs, control passes to block 315 where the SMI is allowed to be delivered to the processor 105, and then control returns to block 305 and the process waits for the next SMI. On the other hand if a match occurs, control passes to block 320 where the SMI is blocked from being delivered to the processor 105, and then control returns to block 305 and the process waits for the next SMI.

Alternatively, the interrupt filter 130 may populate the register set 205 with a list of "reliable" I/O devices 115. The interrupt filter 130 may be initially configured to pass only those SMIs that originate from a reliable I/O device 115 that is identified in the register set 205. The register set 205 may be updated, as needed, to remove a previously reliable I/O device 115 that is determined to now be operating unreliably, such as by generating too many SMIs from that particular device 115 within a certain period of time. Should an unreliable device later become reliable, the interrupt filter 130 may add the now reliable I/O device 115 to the register set 205.

Figure 3B:
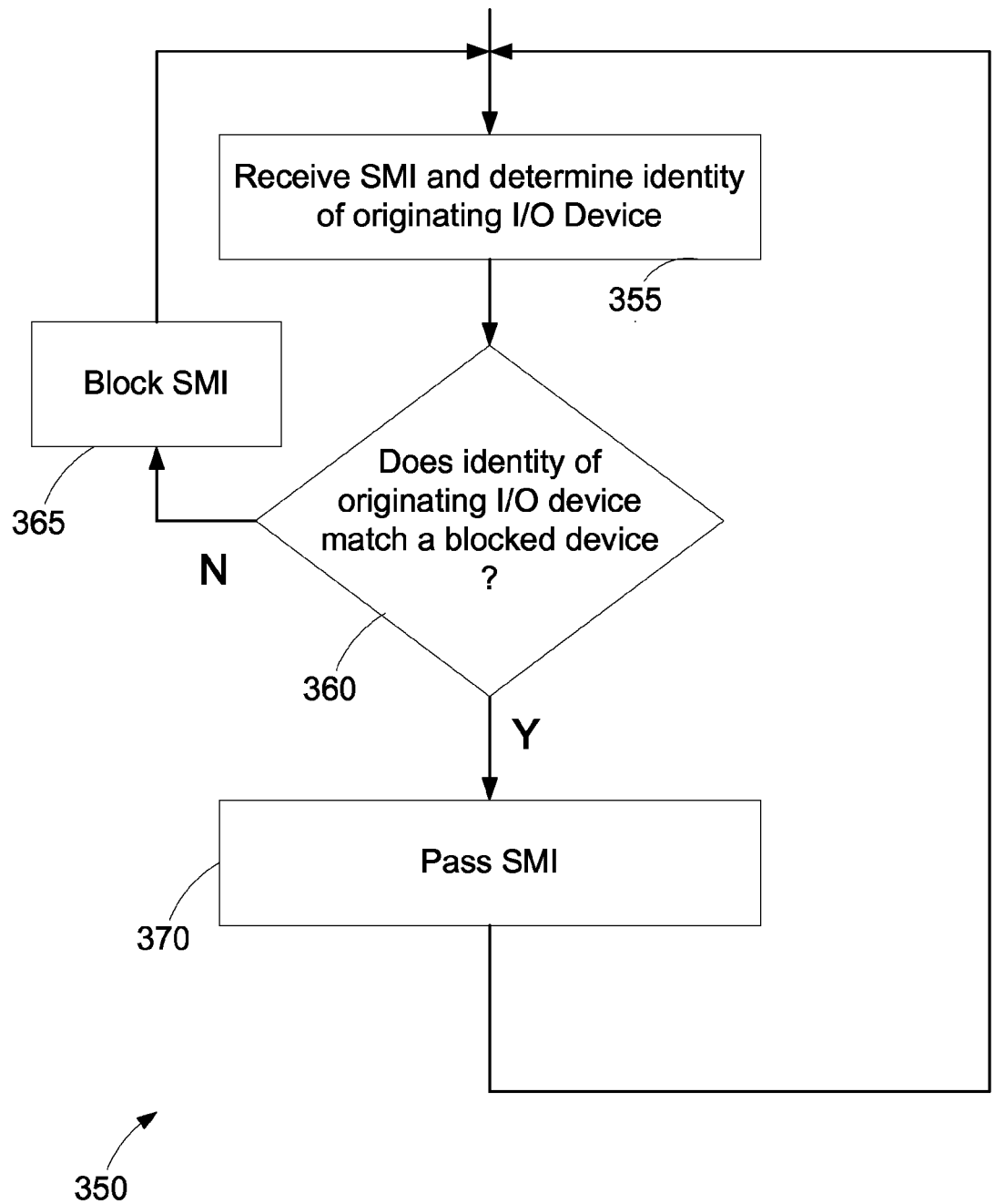

FIG. 3B illustrates one embodiment of a flowchart that describes a method 350 for controlling the operation of the interrupt filter 130 according to the alternative embodiment described above. The process begins at block 355, with the interrupt filter 130 receiving an SMI from a particular I/O device 115. The SMI includes information regarding the identity of the source of the SMI. The identification of the source of the SMI is obtained from the SMI itself, and in decision block 360, it is compared against one or more I/O device identifiers that are stored in the register set 205 to determine if a match exists, which indicates that the SMI should be passed to the processor 105. If no match occurs, control passes to block 365 where the SMI is blocked from being delivered to the processor 105, and then control returns to block 355 and the process waits for the next SMI. On the other hand if a match occurs, control passes to block 370 where the SMI is allowed to pass to the processor 105, and then control returns to block 355 and the process waits for the next SMI.

The register set 205 may be implemented as a special match-register and a control register (these registers could be implemented as separate registers or the functionality could be merged into one register based on implementation considerations). The match-register may be programmed with the address of each I/O device 115 that is approved to issue SMI interrupts. The Interrupt filter 130 may intercept each SMI interrupt and compare the identity of the issuing I/O device 115 against the contents of the match-register. If the contents of the match-register and the issuing peripheral are the same, the SMI would be allowed through to the processor 105. On the other hand, if they do not match, the SMI would be blocked and some appropriate remedial action may be performed. The remedial action could be controlled by programming in the control register. For example, the invalid SMI could be ignored, it could be passed through to the processor 105, it could be converted to another type of interrupt (one that consumes fewer resources to process than an SMI), or it could be converted to some relatively low-overhead notification to the processor such as an entry in an event log 210. Entries posted to the event log 210 could optionally be filtered such that only the first invalid SMI would be reported, or that some limited number could be reported.

This filtering would reduce the processor 105 overhead to process the invalid SMI interrupts and thereby prevent the system 100 from being swamped (DoS) by the overhead required to process an SMI storm. The control register may also have a provision to block all SMI interrupts (for those systems that do not use SMI at all).

Alternatively the register set 205 may organize information contained therein to identify the various types of interrupts that may be delivered or blocked by each particular I/O device. Thus, the source information in the received interrupt signal may be used to access a portion of the register set 205 that contains a list of all interrupt types received from that particular source that may be passed/blocked by the interrupt filter 130. A match will indicate whether the filter 130 should pass/block the received interrupt signal.

It is envisioned that in one embodiment, the register set 205 may include a plurality of match-registers so that multiple, distinct I/O devices 115 could be allowed to generate SMI interrupts. For example, SMI interrupts could be used by the Baseboard Management Controller (BMC), as well as another peripheral that might implement a legacy emulation using SMI (e.g., USB keyboard emulation of legacy keyboard behavior). Additional control bits could be used to activate filtering for more than one SMI source.

In an alternative embodiment, it may be useful to implement a lock control to the register set 205. That is, a lock control may be used to prevent the register set from being modified to remove or add certain I/O devices 115. For example, in a situation in which the computer system 100 firmware must be able to process SMI interrupts from a special I/O device, system computer 100 firmware may nonetheless be capable of programming the I/O controller 130 to allow SMI interrupts from that particular I/O device 115, but system software might reprogram the register set 205 so that the necessary SMI interrupts are blocked. This could lead to platform failure, either due to erroneous software or rogue software. Therefore, in some embodiments, the control register may advantageously include a lock bit that prevents software from reprogramming one or more of the match registers. Additional match registers could be available for software to use to allow SMI interrupts from additional peripherals, but one or more match registers would be programmed by system firmware and be locked such that system software cannot change the values needed by system software. The lock bit would reset (to allow the match registers to change) when a system-reset occurred, after which system firmware could reprogram and re-lock the match register(s).

Figure 4:
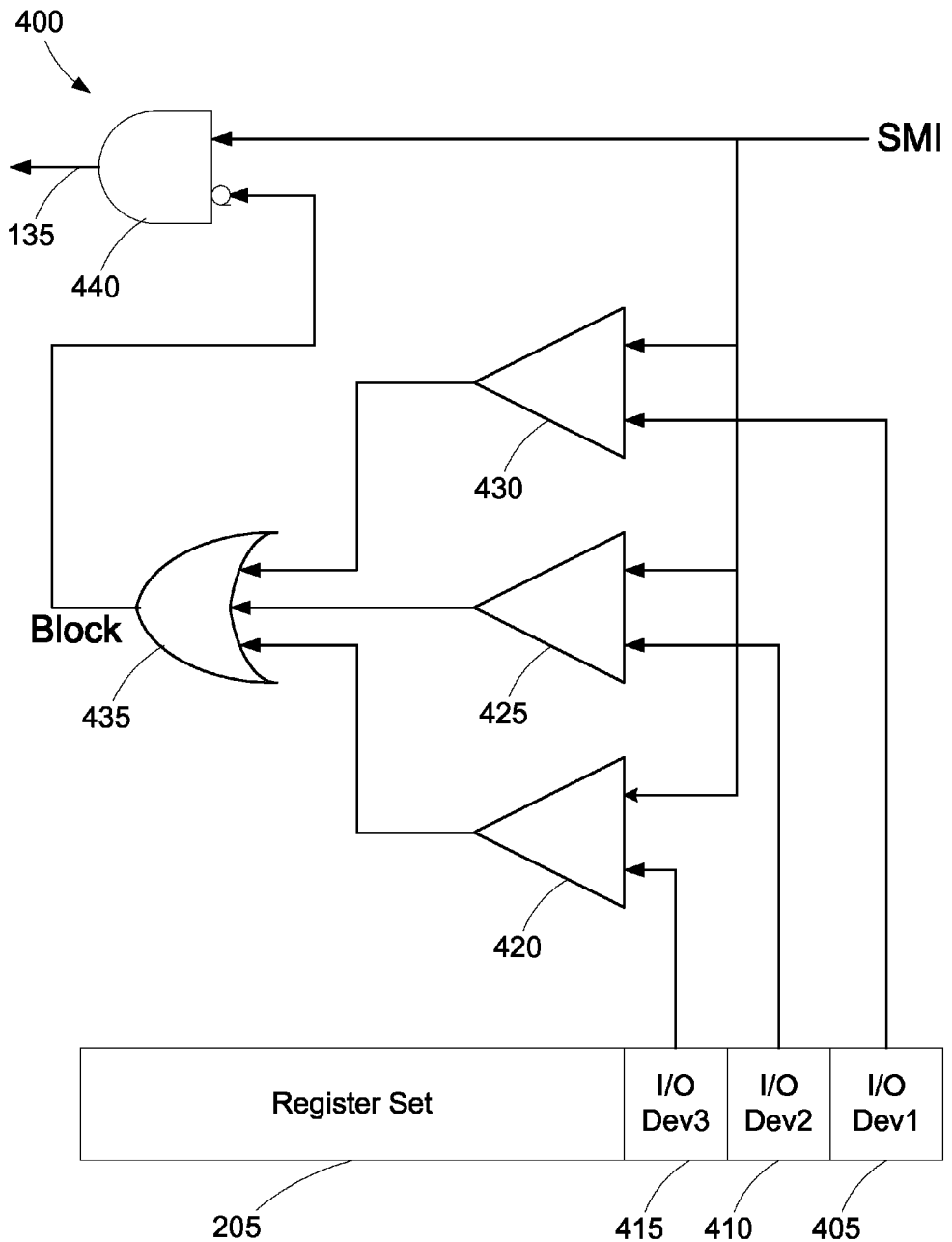
FIG. 4 is a block diagram of comparator circuit that may be used in the I/O controller of FIGS. 1 and 2.

FIG. 4 shows one embodiment of a block level diagram of a comparator circuit 400 that may form at least a portion of the interrupt filter 130. The comparator circuit 400 may be used to determine if an SMI received from one of the I/O devices 115 corresponds to an I/O device 115 that has been identified in the register set 205 as a device that is not permitted to send an SMI. In the illustrated embodiment, the register set 205 is shown to include three storage locations 405, 410, 415 that each identifies an I/O device 115 that is blocked from sending SMIs. Three comparators 420, 425, 430 each have a first input respectively coupled to the three storage locations 415, 410, 405, which contain an identifier for an I/O device 115 that is not permitted to send an SMI. The comparators 420, 425, 430 each have a second input coupled to receive the SMI signal generated by one of the I/O devices 115. The comparators 420, 425, 430 compare a portion of the SMI that includes an identifier of the source of the current SMI with the identifiers stored in register set 205. A match by any of the comparators 420, 425, 430 will produce a logically high signal at one input of an OR gate 435, which responds by delivering a Block signal. The Block signal may be delivered to an inverted input of an AND gate 440. A second input of the AND gate 440 is coupled to receive the current SMI signal. Thus, when the Block signal is asserted by detecting that the SMI is being delivered by an I/O device 115 that is not permitted to deliver an SMI, then the AND gate 440 functions to block the SMI from being delivered to the bus 135 and the processor 105.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A method, comprising:
   determining a type and source associated with an interrupt signal;
   determining if the type of interrupt is permitted to be sent by the source; and
   blocking the interrupt signal in response to the type of interrupt not being permitted by the source.

2. A method, as set forth in claim 1, wherein determining if the type of interrupt is permitted to be sent by the source further comprises comparing one of the type and source of the received interrupt signal with a list.

3. A method, as set forth in claim 2, further comprising updating the list with dynamic information.

4. A method, as set forth in claim 3, wherein updating the list with dynamic information further comprises adding information associated with a newly added source.

5. A method, as set forth in claim 3, wherein updating the list with dynamic information further comprises adding information based on historical interrupt information associated with one or more sources.

6. A method, as set forth in claim 5, wherein adding information based on historical interrupt information associated with one or more of the sources further comprises adding information to block an interrupt type from one or more of the sources based on receiving more than a preselected number of the interrupt types from one or more of the sources within a preselected period of time.

7. A method, as set forth in claim 1, wherein determining if the type of interrupt is permitted to be sent by the source further comprises comparing the type of the interrupt signal with a list of allowed types of interrupts associated with the source.

8. A method, as set forth in claim 1, wherein determining if the type of interrupt is permitted to be sent by the source further comprises comparing the type of the interrupt signal with a list of blocked types of interrupts associated with the source.

9. A method, as set forth in claim 1, wherein receiving the interrupt signal comprises receiving a system management interrupt signal.

10. A method, as set forth in claim 1, wherein determining if the type of interrupt is permitted to be sent by the source further comprises comparing the type of the interrupt against a list indicating one or more devices with permission to deliver the type of interrupt signal.

11. A method, as set forth in claim 10, wherein comparing the type of the received interrupt against the list indicating one or more devices with permission to deliver the type of interrupt signal further comprises comparing the source of the interrupt against a list of one or more sources that do not have permission to deliver the type of interrupt signal.

12. A method, as set forth in claim 10, wherein comparing the type of the received interrupt against the list indicating one or more devices with permission to deliver the type of interrupt signal further comprises comparing the source of the interrupt against a list of one or more sources that have permission to deliver the type of interrupt signal.

13. A method, as set forth in claim 1, wherein determining if the type of interrupt is permitted to be sent by the source further comprises comparing the source of the interrupt against a list indicating one or more devices with permission to deliver the type of interrupt signal.

14. An interrupt filter, comprising:
a memory adapted to contain a list indicating one or more devices with permission associated with an interrupt signal;
a comparator adapted to receive an interrupt signal containing type and source information from said one or more devices, said comparator being adapted to compare at least one of said interrupt type and source information against said list to determine if said one or more devices is permitted to send the interrupt signal; and
a logic circuit for blocking or passing said interrupt signal in response to the result of said comparison.

15. An interrupt filter, as set forth in claim 14, further comprising an interrupt handler adapted to dynamically update the list.

16. An interrupt filter, as set forth in claim 15, wherein the interrupt handler is adapted to dynamically update the list by adding information associated with a newly added device.

17. An interrupt filter, as set forth in claim 15, wherein the interrupt handler is adapted to dynamically update the list by adding information based on historical interrupt information associated with one or more of the devices.

18. An interrupt filter, as set forth in claim 17, wherein the interrupt handler is adapted to dynamically update the list by adding information to block an interrupt type from one or more of the devices based on receiving more than a preselected number of the interrupt types from one or more of the devices within a preselected period of time.

19. An interrupt filter, as set forth in claim 14, wherein the comparator compares the type of the received interrupt signal with a list of allowed types of interrupts associated with the device to determine if the one or more devices is permitted to send the interrupt signal.

20. An interrupt filter, as set forth in claim 14, wherein said comparator is adapted to compare the type of the received interrupt signal with a list of blocked types of interrupts associated with the device.

21. An interrupt filter, as set forth in claim 14, wherein the comparator is adapted to receive a system management interrupt signal.

22. An interrupt filter, as set forth in claim 14, wherein the comparator compares the type of the received interrupt against a list indicating one or more devices with permission to deliver the type of interrupt signal.

23. An interrupt filter, as set forth in claim 14, wherein the comparator compares the type of the received interrupt against a list indicating one or more devices that do not have permission to deliver the type of interrupt signal.

24. An interrupt filter, as set forth in claim 14, wherein the comparator compares the source of the received interrupt against a list of one or more sources that have permission to deliver the type of interrupt signal.

25. An interrupt filter, as set forth in claim 14, wherein the comparator compares the source of the received interrupt against a list of one or more sources that do not have permission to deliver the type of interrupt signal.

* * * * *